United States Patent
Vincent et al.

(10) Patent No.: US 11,085,242 B2
(45) Date of Patent: Aug. 10, 2021

(54) PNEUMATIC DRILLING WITH PACKER SLIDEABLE ALONG STEM DRILL ROD

(71) Applicant: Numa Tool Company, Thompson, CT (US)

(72) Inventors: Robert F. Vincent, Eastford, CT (US); Robert J. Meneghini, Pascoag, RI (US); David T. Flynn, Leominster, MA (US)

(73) Assignee: Numa Tool Company, Thompson, CT (US)

( * ) Notice: Subject to any disclaimer, the term of this patent is extended or adjusted under 35 U.S.C. 154(b) by 76 days.

(21) Appl. No.: 16/426,549

(22) Filed: May 30, 2019

(65) Prior Publication Data

US 2019/0368272 A1   Dec. 5, 2019

Related U.S. Application Data

(60) Provisional application No. 62/677,948, filed on May 30, 2018.

(51) Int. Cl.
*E21B 4/14* (2006.01)
*E21B 21/12* (2006.01)
(Continued)

(52) U.S. Cl.
CPC ............ *E21B 4/14* (2013.01); *E21B 17/18* (2013.01); *E21B 21/12* (2013.01); *E21B 33/12* (2013.01);
(Continued)

(58) Field of Classification Search
CPC ... E21B 1/38; E21B 4/14; E21B 10/38; E21B 17/18; E21B 17/203; E21B 21/10; E21B 21/12; E21B 33/12; E21B 33/128
(Continued)

(56) References Cited

U.S. PATENT DOCUMENTS

| | | | | |
|---|---|---|---|---|
| 2,543,382 A | * | 2/1951 | Schabarum | E21B 21/00 166/185 |
| 2,942,667 A | * | 6/1960 | Bridwell | E21B 21/00 277/333 |

(Continued)

FOREIGN PATENT DOCUMENTS

| | | | | |
|---|---|---|---|---|
| CA | 2820747 A1 | 12/2014 | | |
| WO | WO-9003488 A1 | * | 4/1990 | E21B 21/10 |

(Continued)

OTHER PUBLICATIONS

PCT International Search Report and Written Opinion dated Aug. 29, 2019 (PCT Appl. PCT/US2019/034633).

(Continued)

*Primary Examiner* — Jennifer H Gay
(74) *Attorney, Agent, or Firm* — Alix, Yale & Ristas, LLP

(57) ABSTRACT

A bottom hole assembly (BHA) and method for drilling a bore with a pneumatic percussion hammer includes an expandable packer surrounding the stem rod connected to the hammer. The packer has an inner surface confronting the outer surface of the stem rod in an axially slideable, sealed relationship. The packer is expanded and fixed in the bore to separate a region of high hydraulic pressure above the packer from a region of lower hydraulic pressure below the packer. The method includes operating the pneumatic hammer and bit, while (i) the stem rod advances with a sliding seal against an inside surface of the expanded packer; (ii) pneumatic pressurization and exhaust for the hammer are guided within the stem rod; and (iii) the exhaust from the hammer is discharged into the lower clearance region surrounding the bit at the bottom of the bore.

20 Claims, 10 Drawing Sheets

(51) Int. Cl.
  *E21B 33/128* (2006.01)
  *E21B 33/129* (2006.01)
  *E21B 21/10* (2006.01)
  *E21B 17/18* (2006.01)
  *E21B 33/12* (2006.01)
  *E21B 10/38* (2006.01)
  *E21B 17/10* (2006.01)

(52) U.S. Cl.
  CPC .......... *E21B 33/128* (2013.01); *E21B 33/129* (2013.01); *E21B 10/38* (2013.01); *E21B 17/1042* (2013.01); *E21B 21/10* (2013.01); *E21B 33/1208* (2013.01)

(58) Field of Classification Search
  USPC ........................................................ 175/230
  See application file for complete search history.

(56) References Cited

U.S. PATENT DOCUMENTS

| | | | | |
|---|---|---|---|---|
| 3,151,690 A | * | 10/1964 | Grable | E21B 21/12 175/321 |
| 3,410,353 A | * | 11/1968 | Martini | E21B 4/14 173/73 |
| 3,417,830 A | * | 12/1968 | Nichols | E21B 10/60 175/209 |
| 3,497,020 A | * | 2/1970 | Kammerer, Jr. | E21B 17/10 175/69 |
| 3,503,461 A | * | 3/1970 | Shirley | E21B 21/12 175/230 |
| 4,057,118 A | * | 11/1977 | Ford | E21B 17/1064 175/215 |
| 4,274,497 A | * | 6/1981 | Willis | E21B 21/12 175/100 |
| 4,657,092 A | * | 4/1987 | Franks, Jr. | E21B 17/18 175/232 |
| 4,753,302 A | * | 6/1988 | Gien | E21B 4/14 175/17 |
| 4,819,746 A | * | 4/1989 | Brown | E21B 4/14 175/215 |
| 4,911,250 A | * | 3/1990 | Lister | E21B 21/12 173/17 |
| 4,921,052 A | * | 5/1990 | Rear | E21B 4/14 173/78 |
| 5,139,096 A | * | 8/1992 | Lister | E21B 4/14 173/78 |
| 5,701,959 A | | 12/1997 | Hushbeck et al. | |
| 5,992,537 A | * | 11/1999 | Pascale | E21B 4/14 173/17 |
| 6,148,664 A | | 11/2000 | Baird | |
| 6,236,620 B1 | | 5/2001 | Schultz et al. | |
| 6,854,534 B2 | * | 2/2005 | Livingstone | E21B 21/12 175/57 |
| 7,093,674 B2 | | 8/2006 | Paluch et al. | |
| 7,921,941 B2 | * | 4/2011 | Aros | E21B 4/14 175/296 |
| 8,727,315 B2 | | 5/2014 | Ringgenberg | |
| 9,022,146 B2 | * | 5/2015 | Krueger | E21B 21/08 175/57 |
| 9,945,204 B2 | | 4/2018 | Ross et al. | |
| 2003/0155156 A1 | * | 8/2003 | Livingstone | E21B 34/10 175/57 |
| 2005/0103527 A1 | * | 5/2005 | Church | E21B 7/068 175/62 |
| 2009/0188723 A1 | * | 7/2009 | Aros | E21B 4/14 175/296 |
| 2009/0294180 A1 | * | 12/2009 | Swadi | E21B 21/10 175/293 |
| 2011/0209919 A1 | * | 9/2011 | Aros | E21B 10/38 175/296 |
| 2013/0233626 A1 | * | 9/2013 | Aros | E21B 4/14 175/296 |
| 2015/0337610 A1 | | 11/2015 | Strachan | |
| 2019/0368272 A1 | * | 12/2019 | Vincent | E21B 21/12 |

FOREIGN PATENT DOCUMENTS

| | | | | |
|---|---|---|---|---|
| WO | WO-0214649 A1 | * | 2/2002 | ............ E21B 21/00 |
| WO | 03/062590 A1 | | 7/2003 | |
| WO | 2006/118470 A1 | | 11/2006 | |

OTHER PUBLICATIONS

PCT International Preliminary Report on Patentability for International Application No. PCT/US2019/034633 filed May 30, 2019; dated Dec. 10, 2020; 8 pgs.

* cited by examiner

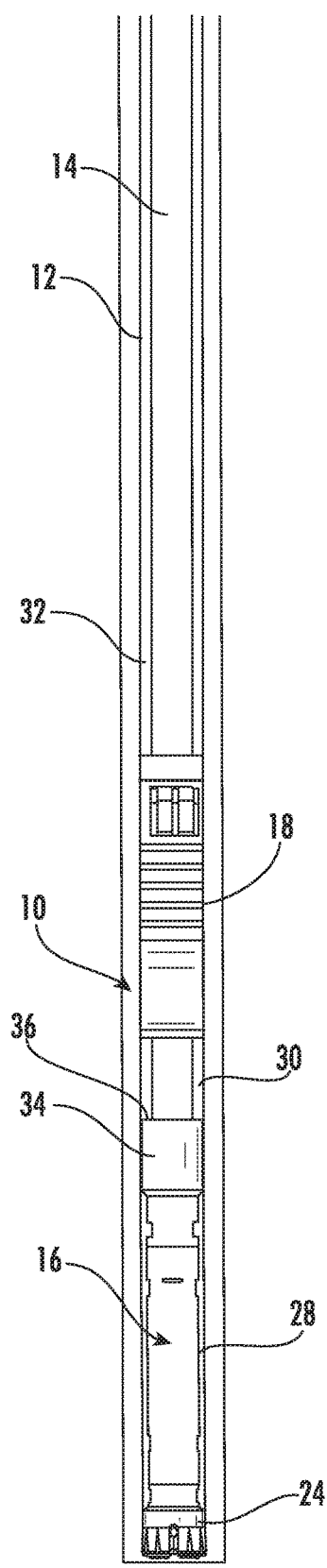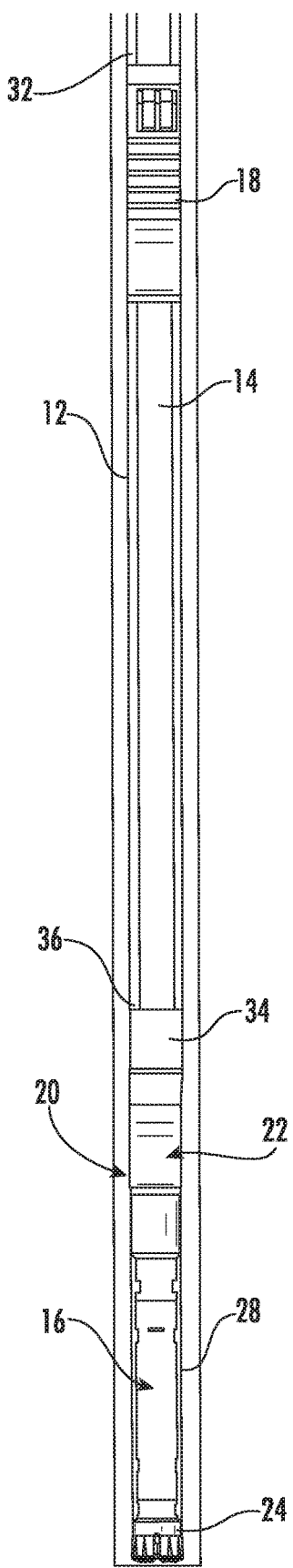

PNEUMATIC DRILLING WITH PACKER SLIDEABLE ALONG STEM DRILL ROD

BACKGROUND

The present invention relates to deep bore drilling with pneumatic percussion hammers.

There is growing interest in large geothermal drilling, especially in geothermally active regions such as Iceland, which satisfies ⅔ of its energy needs geothermally. Bore holes are drilled down approximately 1000 meters, where superheated steam is available at the interface of the water table and volcanic heat.

Other countries are not so geothermally fortunate, but the draw of "free energy" is great. Several European countries have begun programs to drill for "Deep" geothermal sources. In stable older (hard) rock formations, drilling down 7000 or 8000 meters can be required to reach sufficiently hot water or steam to produce energy. Typical pneumatic hammers can reach a depth of approximately 4000 meters before encountering problems, with practical limits likely to be about 6000 meters.

Water hammer systems (high pressure water actuated hydraulic hammers) have been tried for such deep drilling but have not been very successful. Deep holes can be drilled with roller bits, but these are typically 10-20 times slower than hammers in hard rock formations.

The primary problem in deep hole drilling is back hole pressure. Both pneumatic and water hammers rely on a pressure differential between the hammer exhaust and ambient conditions at the bottom of the hole; i.e., the hammer must exhaust into an ambient pressure significantly lower than its supply pressure. A 7000-meter hole filled with water would have a bottom hole ambient pressure of approximately 10,000 psi. Even if only half filled with water, or filled with a liquid with a specific gravity of 0.5, the bottom of the hole would still have an ambient pressure of 5,000 psi.

Air compressor systems may be able to develop up to 2000 psi, but the number of compressors and boosters required for deep hole drilling becomes cost prohibitive. Theoretically a water hammer could be run with pressure up to 10,000 psi, but water hammers have serious durability problems. They can wear out their seals within a few hundred meters of drill travel, and the seals are expensive and time consuming to replace. Additionally, water hammers struggle to clear cuttings from the hole, so must use separately induced control fluids to help clear the hole.

SUMMARY

The present improvement is a drill string bottom hole assembly (BHA) and associated method for drilling a bore with a pneumatic percussion hammer that includes a combination of reverse circulation (RC) drill pipe and expandable packer surrounding the stem rod connected to the hammer.

The bottom assembly comprises a percussion bit, a reverse circulation pneumatic hammer operatively connected to the bit, a reverse circulation stem rod rigidly connected to the pneumatic hammer, and a packer carried on the stem rod. The packer has an inner surface confronting the outer surface of the stem rod in an axially slideable, sealed relationship. Means are provided between the packer and the stem rod for selectively radially expanding the packer while maintaining the axially sliding relationship between the packer and the stem rod. According to aspects of the disclosure, a bottom assembly for drilling a bore from the surface into an earth formation with a pneumatic percussion hammer that advances a drill string including a plurality of connected reverse circulation drill rods includes a percussion bit, a reverse circulation pneumatic hammer operatively connected to the bit, a reverse circulation stem rod having axially opposed top and bottom, and a radially outer surface, with the bottom rigidly connected to the pneumatic hammer, a packer surrounding the stem rod, with a packer inner surface confronting the outer surface of the stem rod in an axially slideable relationship, and a packer outer surface radially spaced from the packer inner surface, said packer outer surface including at least one component which in a deactivated condition of the packer projects a first radial distance from the outer surface of said stem rod and in an activated condition of the packer projects a second radial distance from the outside surface of the stem rod, said second radial distance being greater than said first radial distance, an activation mechanism arranged to activate said packer by applying force to said at least one component to cause said component to move from said first radial distance to said second radial distance, said activation mechanism being fixable in a first position where said force is applied until said packer is deactivated by moving said activation mechanism to a second position where said force is removed and said at least one component returns to said first radial distance, wherein said axially sliding relationship between the inner surface and the stem rod outer surface is present when the packer is activated and deactivated.

The packer may be activated using a wire line, battery pack, hydraulic actuation, or mechanical forces generated by raising, lowering and/or rotating the drill string. The packer may include an annular, flexible seal distorted by application of said force to bulge radially outwardly. The packer may include a plurality of rigid grips having a deactivated position at a first radial distance and an activated position at a second radial distance greater than the first radial distance. The bit has an effective outer diameter that defines the diameter of the inside surface of the bore. The packer is configured to have a deactivated diameter that is slightly smaller than the effective outer diameter of the bit and an activated diameter at least equal to the effective outer diameter of the bit. When activated, the packer is fixed against the inside surface of said bore to resist axial and rotational movement relative to the inside surface of said bore while maintaining an axially sliding, sealed relationship relative to the stem rod.

The percussion bit has a bottom face and a side surface and includes at least one exhaust passage open at the side surface and at least one collection passage open at the bottom face. The pneumatic hammer includes a collection tube connected to the at least one collection passage and the stem rod includes an inner tube defining a return flow path in communication with the collection tube. During operation, the pneumatic hammer releases exhaust through the at least one exhaust passage in the bit. The exhaust enters the bottom of the bore, picks up cuttings and changes direction to flow upward through the at least one collection passage in the bottom face of the bit, into the said collection tube and the return flow path defined by the stem rod and drill string.

The bottom assembly may include one a collection tube blocker that may be connected between the pneumatic hammer and the stem rod, or at other locations above the bottom assembly. The collection tube blocker may include a base defining an inlet passage in communication with the collection tube, and a top defining an outlet passage in communication with the return flow path in said stem rod. The collection tube blocker may include a valve member moveable between an open position allowing communication between the inlet passage and outlet passage and a closed position blocking communication between said inlet passage and said outlet passage.

According to aspects of the disclosure, the stem rod includes an outer tube and defines an air delivery annulus between said inner tube and said outer tube. The pneumatic hammer includes an air intake passage, and the collection tube blocker defines an air inlet connected to the air delivery annulus of the stem rod and an air outlet in communication with the air intake passage of the pneumatic hammer. A valve member of the collection tube blocker may have an open position allowing air flow between said air inlet and said air outlet and a valve member closed position preventing air flow between said air inlet and said air outlet. The collection tube blocker valve member may be moved from the open position to the closed position by air pressure at said air intake. Alternatively, the valve member may be moved by a wire line, battery pack, hydraulic actuation, or mechanical forces generated by raising, lowering and/or rotating the drill string.

According to aspects of the disclosure, a method for drilling a bore from the surface of an earth formation with a pneumatic percussion hammer that advances a drill string including a plurality of connected reverse circulation drill rods, comprises the steps of:

a. drilling a starter bore from the surface, thereby defining a bore in the earth formation with an inside surface and a bottom;

b. inserting a bottom assembly into the bore, including a percussion bit at the bottom of the hole, a reverse circulation pneumatic hammer operatively connected to the bit, a reverse circulation stem rod connected at a bottom end to the pneumatic hammer and extending with annular clearance between an outside surface of the drill rod and the inside surface of the bore to a top end, and a packer surrounding the stem rod and positioned at the bottom of the stem rod adjacently above the hammer, in the annular clearance;

c. expanding the packer radially outward against the inside surface of the bore, thereby forming an annular seal between the stem rod and the inside surface of the bore to separate an upper annular clearance above the expanded packer from a lower annular clearance between the packer and the bottom of the bore;

d. maintaining a column of drilling fluids or encountered liquids above the packer in the upper annular clearance, thereby separating the lower annular clearance from hydraulic pressure generated by the column of drilling liquids or encountered fluids in the upper annular clearance;

e. operating the pneumatic hammer and bit while advancing the bit, hammer, and stem rod together through the bottom of the hole, while (i) the stem rod advances with a sliding seal against an inside surface of the expanded packer; (ii) pneumatic pressurization and exhaust for the hammer are guided within the stem rod; and (iii) the exhaust from the hammer is discharged into the lower clearance region;

f. stopping operation of the pneumatic hammer and bit when the top of the stem rod has advanced to a position adjacent the expanded packer;

g. retracting the packer to break the annular seal between the stem rod and the inside surface of the bore; and h. re-positioning the packer on the stem rod, adjacently above the hammer;

i. expanding the packer radially outward against the inside surface of the bore, j. connecting another drill rod at the top of the drill string; and k. repeating the steps c-i of expanding, maintaining, operating, stopping, retracting, repositioning, expanding and connecting as the hole is drilled deeper into the formation.

Notably, the packer is axially slidable relative to the stem rod during both the drilling phase and the drill rod addition phase of operation. During the drilling phase, the activated packer remains sealingly fixed against the bore wall as the stem rod advances downwardly through the packer, elevating the position of the packer to the top of the stem rod, away from the hammer. The drill string may be raised to deactivate the packer, which is then released from its fixed position in the bore, and the drill string is then lowered to reposition the packer at the bottom of the bore, just above the pneumatic hammer and bit, where the packer is reactivated and is again fixed longitudinally and rotationally within the bore.

According to aspects of the disclosure, the method may include the steps of closing a connection between a collection tube in the pneumatic hammer and a return flow path in the stem rod and drill string before retracting and repositioning the packer; and opening the connection between the collection tube and the return flow path after the packer has been repositioned and expanded to secure the packer to separate the region below the packer from the pressure of the column of fluids in the annulus surrounding the drill string above the packer. The closed return path prevents high pressure fluids at the bottom of the bore from filling the return flow path while the packer is deactivated. One or more valves may be employed to close and open the return flow path, and the valves may be positioned anywhere in the drill string above the pneumatic hammer.

BRIEF DESCRIPTION OF THE DRAWINGS

FIG. 1 illustrates a reverse circulation pneumatic hammer in conjunction with an embodiment of a packer slideable along a stem drill rod in a ground hole according to aspects of the disclosure;

FIG. 2 illustrates a reverse circulation pneumatic hammer in conjunction with the packer of FIG. 1 and an embodiment of an exhaust path blocking valve according to aspects of the disclosure;

DETAILED DESCRIPTION

Figure 3:
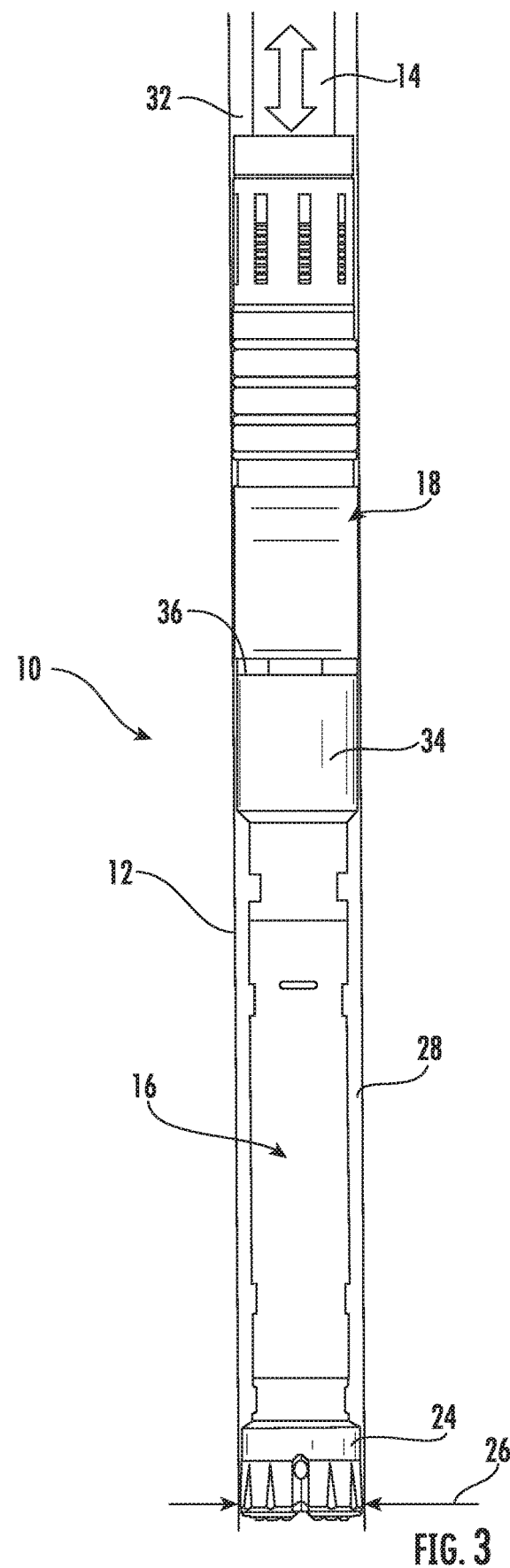
FIG. 3 is an enlarged view of the reverse circulation pneumatic hammer and packer of FIG. 1, with the packer in contact with an adaptor behind the pneumatic hammer according to aspects of the disclosure.

Once a ground hole has been drilled, or generally when drilling has reached a depth where the cost of normal pneumatic hammer operations becomes prohibitive, a bottom hole assembly (BHA) 10 according to aspects of the disclosure is run into the ground hole (also referred to as "bore") 12. The major portion of the drill string is standard reverse circulation (RC) dual wall drill pipe, with the last section of a drill string above the drill being referred to as a drill stem rod 14. Any reasonable and properly sized drill rod can be accommodated. FIG. 1 illustrates a BHA 10 including a drill stem rod 14 connected a pneumatic hammer 16 in conjunction with one embodiment of a packer 18 slideable along the stem rod 14 according to aspects of the disclosure. FIG. 2 illustrates an alternative BHA 20 including a drill stem rod 14 connected to a pneumatic hammer 16 in conjunction with one embodiment of a collection tube blocker 22 and a packer 18 slideable along the stem rod 14 according to aspects of the disclosure. The BHA 10 of FIGS. 1 and 2 is shown in a ground hole (bore) 12 having a diameter corresponding to the diameter of the bit 24. The bit 24 has an effective outer diameter (the "bit effective diameter") 26 corresponding to the inside diameter of the bore 12. The bore 12 has a diameter greater than the diameter of the drill pipe including the stem rod 14, resulting in an annular space 28 that surrounds the drill pipe above the bit 24. This annular space 28 is typically filled with liquid, including drilling mud used in conjunction with rotary bits that may have been used to drill the upper portions of the hole, and encountered liquids such as water. The purpose of the packer 18 is to seal the annular space 28 between the inside surface of the bore 12 and the outside surface of the stem rod 14. The disclosed packer 18 can be selectively radially expanded (activated), while maintaining a sealed sliding relationship between the packer and the stem rod 14. When retracted (deactivated), the packer 18 has an outside diameter smaller than the inside diameter of the bore 12 and when activated the packer 18 outside diameter at least equal to the diameter of the bore 12.

One embodiment of a BHA 10 comprises the bit 24, hammer 16, stem rod 14 and packer 18. The reverse circulation hammer 16 and bit 24 are conventional, such as described in U.S. Pat. No. 4,819,746, configured for the particular conditions of the formation and job site. The construction and operation of a pneumatically driven, reverse circulation (RC) hammer and bit are well-understood and are not the subject of the present disclosure. A BHA 10 according to aspects of the present disclosure employs a packer 18 slideable along the stem rod 14 to seal the annular space 28 between the stem rod 14 and the inside surface of the bore 12 to isolate a lower clearance region 30 of the bore 12 below the packer 18 from an upper clearance region 32 of the bore above the packer 18. High pressure supply air is delivered to the hammer 16 through the outer tube of the dual wall drill string and stem rod 14, and after each percussion stroke of the hammer 16, lower pressure exhaust air is discharged into the area beneath and surrounding the bit 24 (the bit area) where the exhaust air changes direction, picks up cuttings, and travels up the central tube of the dual wall RC stem rod and drill string to the surface. During this drilling phase, the activated packer 18 isolates the lower clearance region 30 from the extremely high pressure of the drilling fluids or encountered liquids filling the upper clearance region 32 above the packer 18, thereby maintaining a low enough pressure in the lower clearance region 30 surrounding the bit 24 for the exhaust air to clear the cuttings and flow up the collection openings in the bit 24 and hammer 16, and into the return flow path at the center of stem rod 14 and drill string.

FIG. 3 illustrates the BHA of FIG. 1, with the packer 18 resting on a packer adaptor 34 connected to the backhead (rear end) of the hammer 16. The packer adaptor 34 provides an annular shoulder 36 against which the packer 18 can rest when the BHA 10 is lowered into and raised out of the bore 12. The packer adaptor 34 also connects the air supply between the walls of the drill pipe and stem rod 14 with the air intake in the hammer 16 and also connects the return flow path at the center of the drill pipe with the collection tube at the rear end of the hammer 16. A drill rig on the surface (not shown) controls movement of the drill string, including the stem rod 14 and BHA 10. Under control of the drill rig, the drill string can be raised and lowered in the bore 12, and rotated in a clockwise direction during drilling. In FIGS. 4-13, the left of the figure corresponds to an upward direction away from the bottom of the hole, and the right of the figure corresponds to a direction toward the bottom of the hole.

Figure 4:
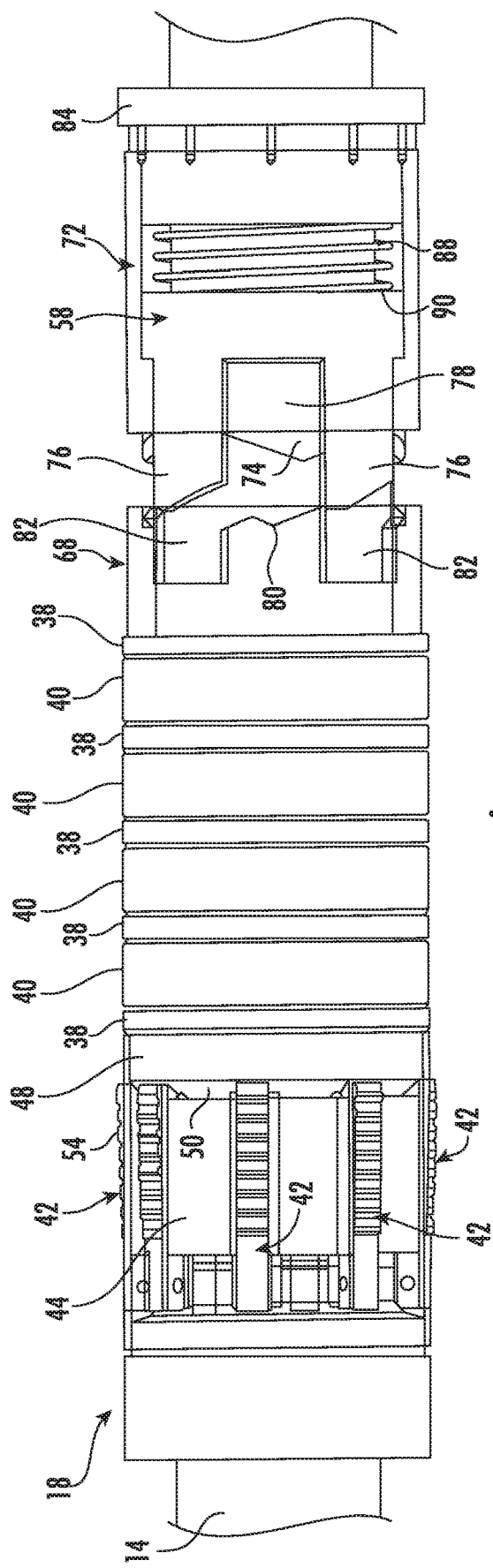
FIG. 4 is a side view of a mechanically activated packer according to aspects of the disclosure, with some parts removed to show internal components.
Figure 5:
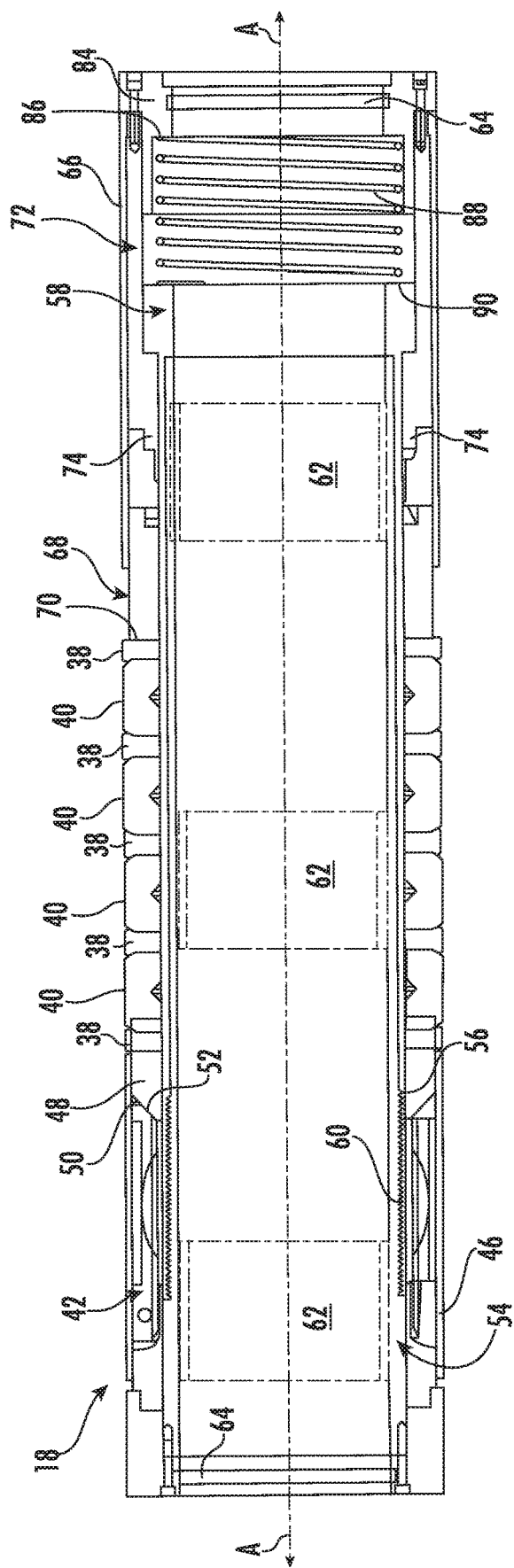
FIG. 5 is a sectional view of a mechanically activated packer according to aspects of the disclosure.

One embodiment of a packer 18 is illustrated in FIGS. 4 and 5. The packer 18 of FIGS. 4 and 5 is one example of a mechanically actuated packer intended to be one example of a packer compatible with the disclosed drilling systems and methods. Other means for actuating a packer may be employed, for example a wire line, battery pack, hydraulic actuation, or mechanical forces generated by raising, lowering and/or rotating the drill string may be compatible with the disclosed drilling systems and methods. A suitable packer can be activated and deactivated by rotation, compression, or tension, using remote or wireline activation controls. Opposite end functions or detented functions can be used, for both activating and deactivating from one end.

The disclosed packer 18 has an outside diameter in a deactivated state that is slightly smaller than the inside diameter of the bore 12 in which it will be used. As best seen in FIG. 5, the packer 18 includes overlapping tubes that thread together to provide a rigid, hollow tubular structure. The hollow structure is surrounded by an alternating series of spacers 38 and compression rings 40. The compression rings 40 are constructed of a durable, flexible rubber or elastomer material configured to bulge radially outwardly to seal against the inside surface of the bore 12 when placed under compression along a longitudinal axis A of the packer 18. Above the compression rings 40, eight grips 42 are pivotably supported in a grip housing 44 surrounded by a grip case 46 (not shown in FIG. 4). The grips 42 are biased toward a retracted position where they do not protrude from the grip case 46, as shown in FIG. 5. The retracted position of the grips 42 corresponds to a deactivated condition of the packer 18, as will be described in greater detail below. A grip activation sleeve 48 is positioned above the compression rings 40 and includes a beveled annular surface 50 that cooperates with a complementary surface 52 on each grip 42 to move the grips 42 from the retracted position shown in FIG. 5, to the projected position shown in FIG. 4. The projected position of the grips 42 corresponds to an activated condition of the packer 18. The spacers 38, compression rings 40, and grip activation sleeve 48 are configured to slide axially on the outside diameter of the tubular structure of the packer 18, so force applied along the packer axis A from right to left in FIGS. 4 and 5 will load and radially expand the compression rings 40 and force the grips 42 toward a projecting position where the grips 42 bite into the rock forming the inside surface of the bore 12. When the grips 42 are in a projected position, the tips of the grips 42 resist downward movement of the packer 18, while teeth 54 on the outside surfaces of the grips 42 resist upward movement of the packer 18 until the packer is deactivated and the grips 42 are retracted. An activated condition of the packer is one in which the compression rings 40 are axially loaded to bulge radially outward against the inside of the bore 12 and the grips 42 are held in a projected position against the inside of the bore 12. An activated packer is longitudinally fixed in the bore 12 and fills the annular space between the stem rod 14 and the inside surface of the bore 12.

The tubular structure of the packer 18 includes a packer top 54 that defines the inside diameter of the hollow structure of the packer 18 and includes a male thread 56. The packer top 54 is surrounded by a complementary tubular fixed ratchet 58 that includes a female thread 60 which mates with the male thread 56 of the packer top 54. As shown in FIG. 5, the packer top 54 and fixed ratchet 58 overlap and thread together to form a rigid, tubular structure. The packer 18 includes a plurality of seals 62 (schematically illustrated in FIG. 5) on the inside diameter of the packer top 54 to seal against the outside surface of the stem rod 14. According to aspects of the disclosure, the stem rod 14 moves axially through the packer 18 and rotates during drilling, so the seals 62 on the inside surface of the packer 18 are dynamic seals that permit such movement while preventing fluid flow between the packer 18 and the stem rod 14. The outside surface of the stem rod 14 may be provided with a surface finish and/or coatings that will facilitate movement of the stem rod 14 within the packer seals 62, while limiting seal wear. Wipers 64 at each end of the packer 18 protect the seals 62 by preventing material from entering the area between the packer 18 and the stem rod 14. Although three seals 62 are schematically represented in FIG. 5, the number of seals may be more or less than three.

Figure 6:
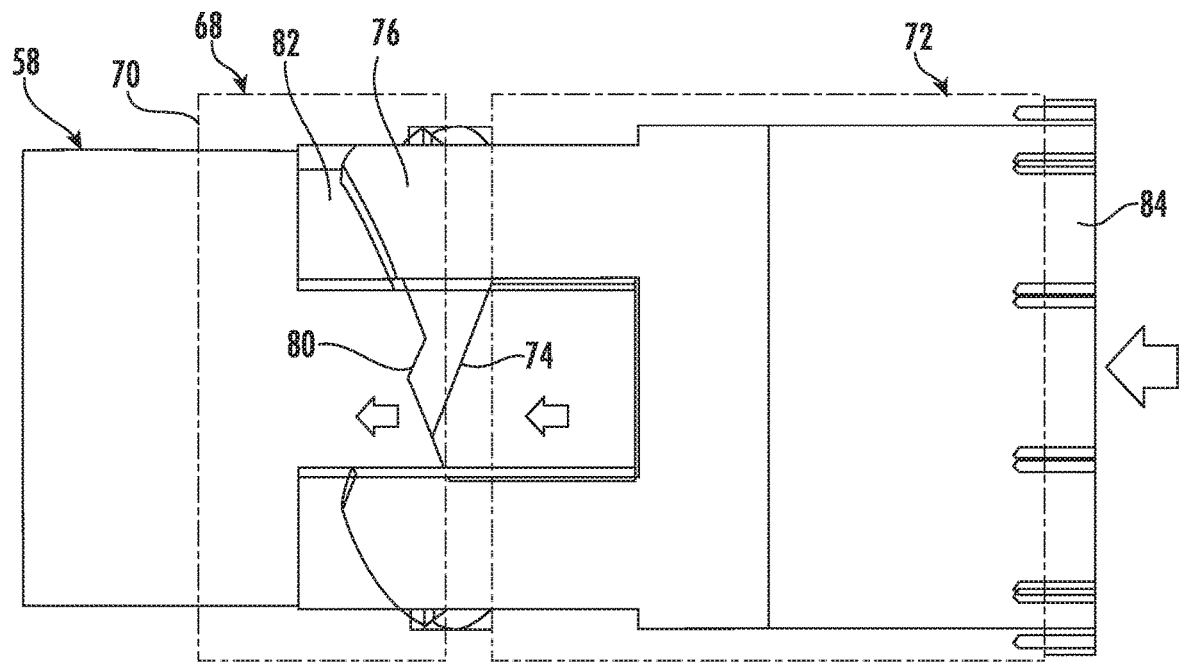
FIGS. 6-11 are side views of components that activate and deactivate expansion of the mechanically activated packer of FIGS. 4 and 5.

FIG. 4 omits a bottom case 66 that surrounds three components that cooperate to activate and deactivate the packer 18. A rotating ratchet 68 is positioned below the compression rings 40 and includes an upper shoulder 70 that bears on the lower most spacer 38. An actuator 72 surrounds the lower end of the fixed ratchet 58 and includes four cam projections 74 projecting inwardly to fit between four latch projections 76 on the fixed ratchet 58. The fixed ratchet 58 defines four axially oriented slots 78 between the latch projections 76. The actuator 72 is assembled over the fixed ratchet 58, with the cam projections 74 mated with the slots 78 of the fixed ratchet 58 prior to assembly of the fixed ratchet 58 to the packer top 54. The fixed ratchet 58 and actuator 72 are locked together and cannot rotate relative to each other. The rotating ratchet 68 includes four ratchet surfaces 80 and four latch pockets 82 that receive the latch projections 76 of the fixed ratchet 58 when the packer 18 is deactivated as shown in FIG. 6. A packer end cap 84 includes openings for fasteners that secure the end cap 84 to the actuator, trapping an end of the cylindrical bottom case 66. The bottom case 66 surrounds the actuator 72, fixed ratchet 58 and a portion of the rotating ratchet 68 to protect the ratchet mechanism. The packer end cap 84 defines an inward projecting annular shoulder 86, and a spring 88 is compressed between the end cap shoulder 86 and a rear end 90 of the fixed ratchet 58 to bias the actuator 72 toward an axially extended position as shown in FIG. 5. Force applied to the end cap 84 along the axis A of the packer 18 (corresponding to an upward direction in the bore 12), will overcome the bias of the spring 88 and move the end cap 84, bottom case 66 and actuator 72 toward the rotating ratchet 68, which brings the actuator cam projections 74 into contact with the ratchet surfaces 80 of the rotating ratchet 68. Axial movement of the actuator 72 is guided by engagement of the cam projections 74 of the actuator 72 moving in the slots 78 of the fixed actuator 58. Activation and deactivation of the disclosed packer 18 will be described with reference to FIGS. 6-11.

Figure 7:
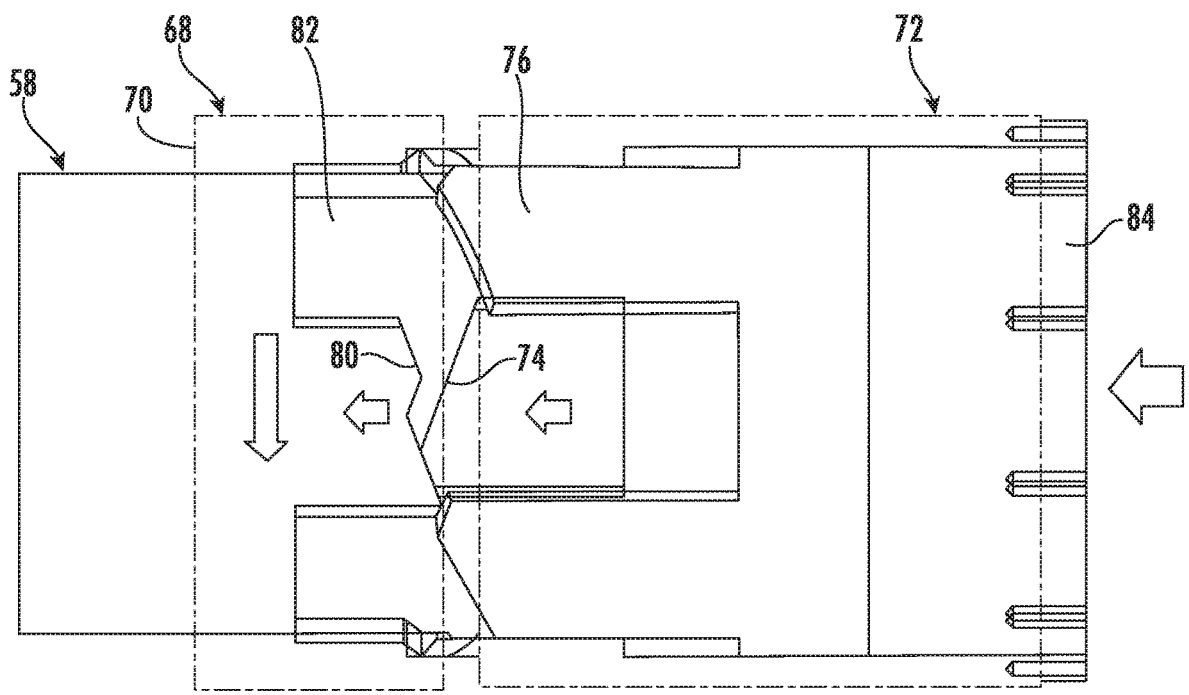
Figure 8:
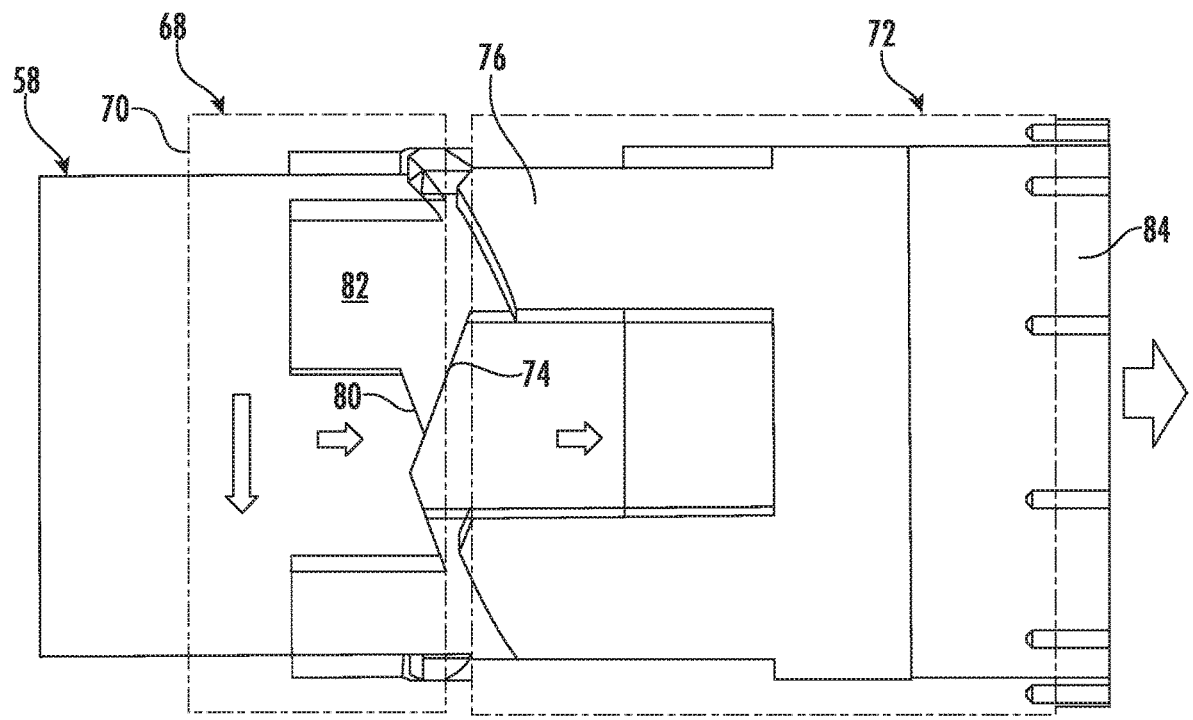
Figure 9:
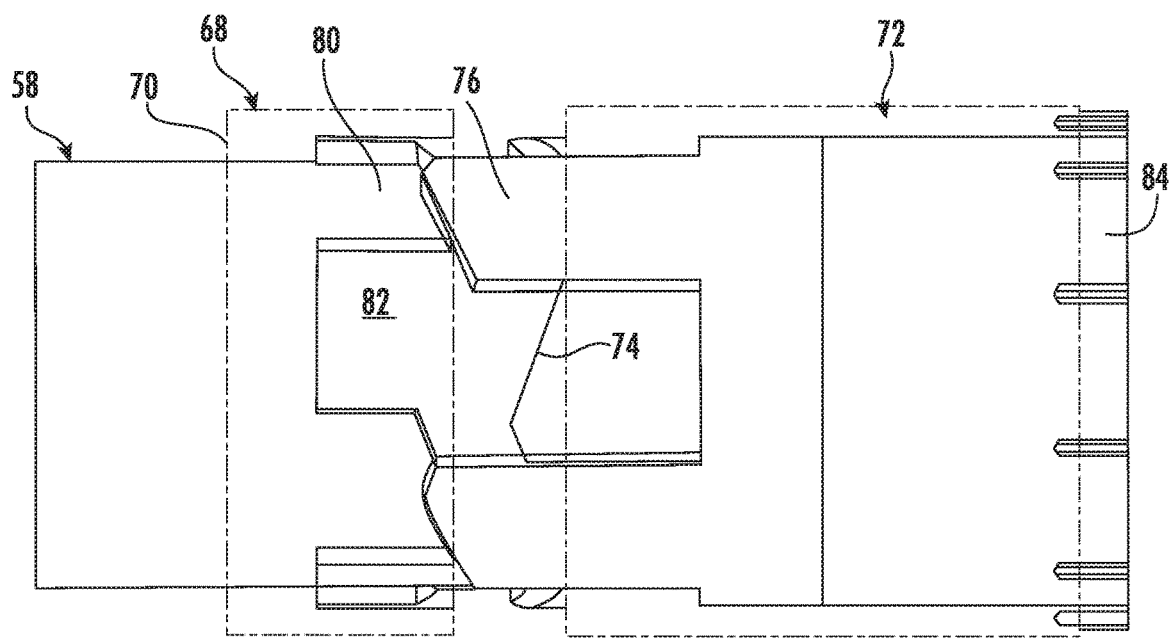

FIG. 6 illustrates the position of the rotating ratchet 68, actuator 72 and fixed ratchet 58 when the packer 18 is in a deactivated condition. In a deactivated condition, the latch projections 76 of the fixed ratchet 58 are received in the latch pockets 82 on the rotating ratchet 68, the stack of compression rings 40, spacers 38, and grip activation sleeve 48 (see FIGS. 4 and 5) are unloaded, and the grips 42 are in their retracted position, as shown in FIG. 5. Activation of the packer 18 begins by application of force to the end cap 84, which can be generated by raising the drill string to bring the shoulder 36 of the packer adaptor 34 into contact with the packer end cap 84 as shown in FIG. 3. Force applied to the end cap 84 compresses the spring 88, advancing the cam projections 74 of the actuator 72 into contact with the cam surfaces 80 of the rotating ratchet 68. As shown in FIGS. 6 and 7, contact between the cam projections 74 of the actuator 72 and the cam surfaces 80 of the rotating ratchet 68 moves the rotating ratchet 68 axially against the bias of the compression rings 40, which withdraws the latch projections 76 of the fixed ratchet 58 from the latch pockets 82 of the rotating ratchet 68. The angle and length of the surfaces of the cam projections 74 on the actuator 72 and cam surfaces 80 on the rotating ratchet 68 cause the rotating ratchet 68 to rotate as the cam surfaces 80 slide along the cam projections 74. When the latch projections 76 of the fixed ratchet 58 are withdrawn from the latch pockets 82, the rotating ratchet 68 is free to begin to rotate as shown in FIG. 7. FIG. 8 illustrates the position of the actuator 72, rotating ratchet 68 and fixed ratchet 58 when the latch projections 76 of the fixed ratchet 58 are clear of the latch pockets 80 and axial force on the packer 18 is released by (for example) lowering the drill string.

When the axial force on the packer 18 is released, the actuator 72 moves away from the rotating ratchet 68 as shown in FIG. 8, and the rotating ratchet 68 follows. The rotating ratchet 68 has rotated so that when the latch projections 76 of the fixed ratchet 72 come into contact with the cam surfaces 80 of the rotating ratchet 68, the latch projections 76 are guided into the latched position shown in FIG. 9. In the latched position, the latch projections 76 of the fixed ratchet 58 are engaged with the cam surfaces 80 of the rotating ratchet 68, which applies axial force to the spacers 38, compression rings 40, and grip activation sleeve 48. The grip activation sleeve 48 moves toward the grips 42, and the beveled surface 50 of the grip activation sleeve 48 acts on the complementary surface 52 of the grips 42 to force the tips of the grips 42 radially outward into contact with the inside of the bore 12. The compression rings 40 are loaded and bulge radially outwardly into contact with the inside of the bore 12. When activated, the packer 18 is fixed in an axial position and sealed against the inside of the bore 12. The packer 18 is also sealed against the outside diameter of the stem rod 14, so when activated, the packer 18 is capable of isolating the lower clearance region 30 (beneath the packer 18) 18 from the column of fluid filling the upper clearance region 32 (above the packer 18).

Figure 10:
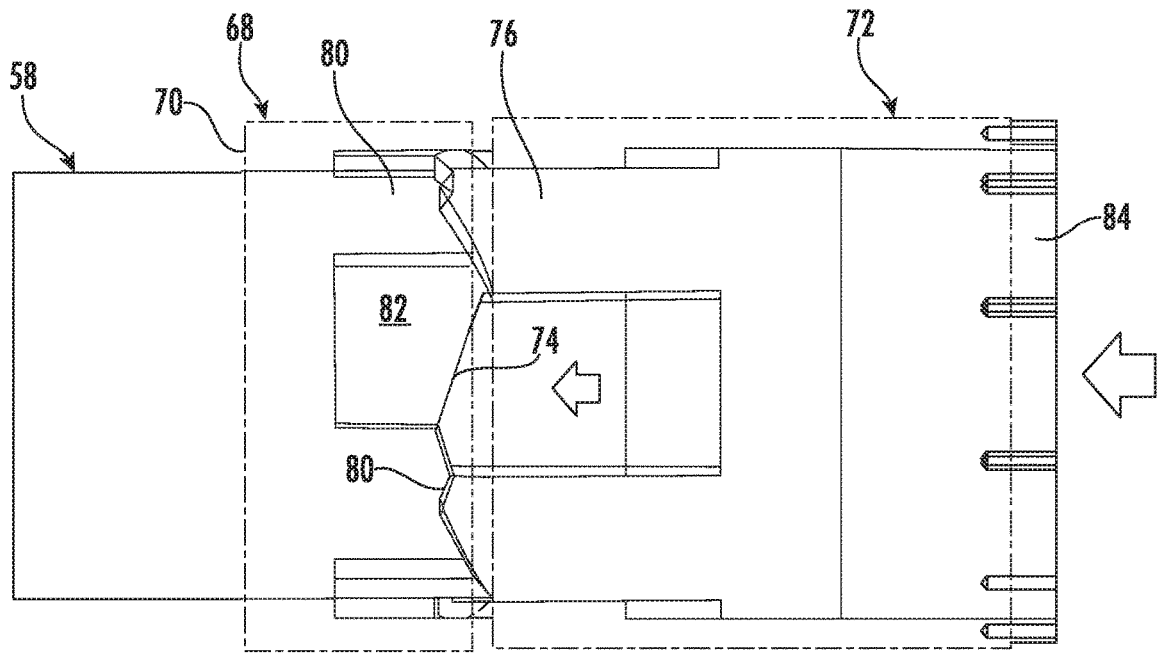
Figure 11:
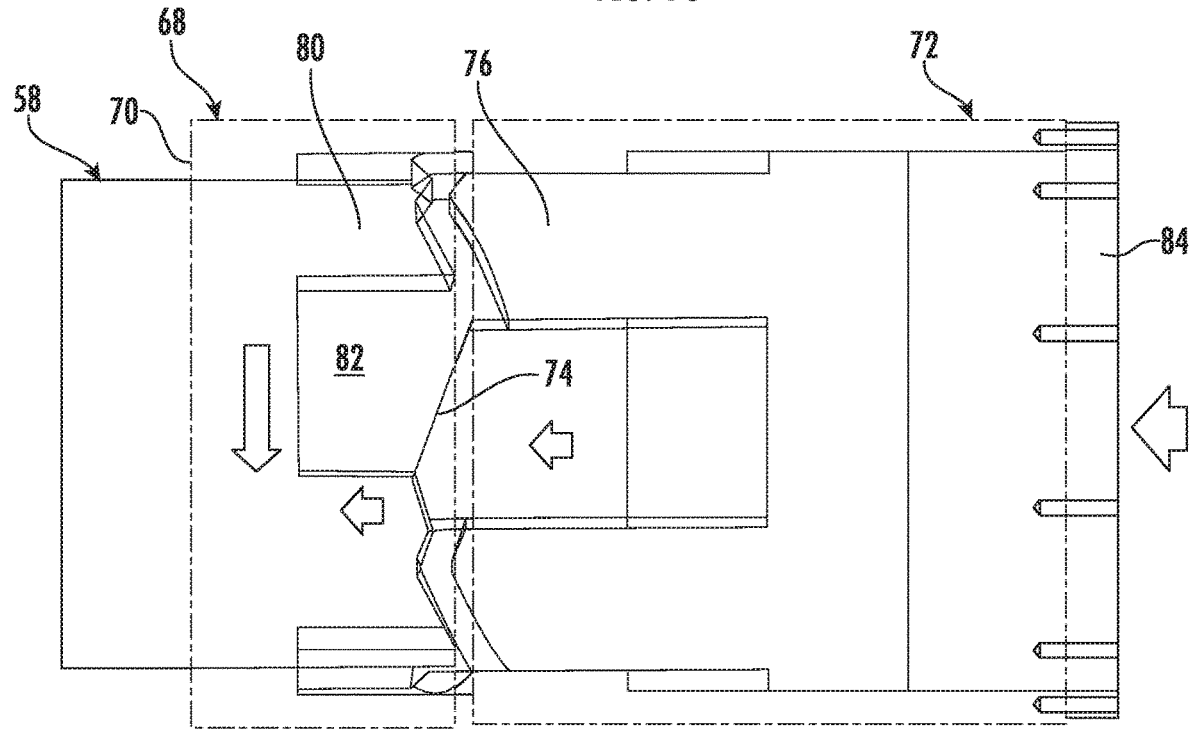

FIGS. 10 and 11 illustrate deactivation of the packer 18. As shown in FIG. 10, with the packer 18 latched in the activated position, axial force is again applied to the bottom end of the packer 18 by (for example) raising the drill string so that the packer adaptor 34 comes into contact with the end cap 84 of the packer 18. The cam projections 74 come into contact with the cam surfaces 80 of the rotating ratchet 68. As shown in FIG. 11, the advancing actuator cam projections 74 load the compression rings 40 and move the rotating ratchet 68 axially to release the latch projections 76 of the fixed ratchet 58 from their latched engagement with the cam surfaces 80 of the rotating ratchet 58. When the latch projections 76 are released and the axial force on the packer 18 is withdrawn, the long surface of the latch projections 76 slide along the cam surface 80 of the rotating ratchet 68, and the latch projections 76 are received in the latch pockets 82 as shown in FIG. 6.

Activation and deactivation of the packer 18 using an axial force against the bottom of the packer has been described. It may be necessary for the packer/adaptor interface to have two positions; a first position in which upward movement of the adaptor 34 activates the packer 18, and a second position in which upward movement of the adaptor 72 does not activate the packer 18. The second position may be required for pulling the disclosed BHA 10 out of the bore 12, where the packer 18 cannot activate during the removal process. It is possible to provide keys and keyways on the mating faces of the end cap 84 and the adaptor shoulder 36, where with the keys engaged in the keyways, the packer 18 cannot be activated, and when the keys are not engaged in the keyways, the packer 18 can be activated.

The stem rod 14 is internally similar to a standard dual wall reverse circulation drill rod. The OD of the stem rod may be finished to slide inside of the packer and ID packer seals 62. As shown in FIGS. 1 and 3, the stem rod 14 attaches to a packer adaptor 34, which connects the stem rod 14 to the reverse circulation (RC) hammer 16. The stem rod 14 and reverse circulation drill rod are double wall RC pipe, defining an air delivery annulus between the two walls, and a return flow path at the center. High pressure air is delivered through the annulus to operate the RC hammer 16 and is exhausted into the space beneath the bit 24, where it picks up cuttings and travels up the return flow path (also called the collection tube). Pneumatic RC hammers require a substantial pressure differential between the supply air and ambient conditions at the bottom of the hole. One aspect of the disclosed system and method is the use of a slideably repositionable packer 18 to isolate the region of the bore below the packer (lower clearance region 30) from a column of fluid above the packer (upper clearance region 32). Since the RC drill pipe and stem rod 14 include a return flow path that communicates with the surface, closing the clearance between the stem rod 14 and the inside of the bore creates an area of lower pressure beneath the packer 18.

Operation of the BHA 10 shown in FIGS. 1 and 3 will be described according to a disclosed method. In the BHA 10 of FIGS. 1 and 3, a packer adaptor 34 connects the stem rod 14 to a reverse circulation pneumatic hammer 16. The packer adaptor 34 connects the air delivery annulus of the stem rod 14 to the air supply channels in the hammer 16, and connects the return flow path in the hammer 16 to the return flow path in the stem rod 14. The packer adaptor 34 also provides a radially projecting shoulder 36 that can be used to apply axial force to the packer 18 for activating and deactivating the packer 18 as described above. The packer adaptor 34 may be integrated into the backhead of the hammer 16 and is not limited to a separate component as illustrated in FIGS. 1 and 3. According to one embodiment of a method of pneumatic drilling, the BHA 10 is lowered to the bottom of a bore 12 with the packer 18 in a deactivated condition. The drill string is raised to bring the adaptor 34 into contact with the lower end of the packer 18, which activates the packer 18 as described above. The activated packer 18 isolates the region of the bore below the packer (the lower clearance region 30) from the column of fluids above the packer (the upper clearance region 32), creating a region of relatively low pressure below the packer 18 in the lower clearance region 32. With the packer activated, the hammer 16 is operated and the stem rod 14 is rotated to drill the bore 12. As the bore 12 is deepened, the stem rod 14 advances through the packer 18, which remains longitudinally fixed in the bore 12. When the upper end of the stem rod 14 has advanced to a position near the packer 18, drilling is stopped and a sequence of steps taken to allow another section of drill rod to be connected to the drill string. First, the drill string is raised from the bottom of the bore, which allows the bit to drop into a "blow" position where the pneumatic hammer does not reciprocate, and high pressure air is emitted through exhaust passages in the bit. As is known by those skilled in the art, with the bit in the "blow" position, raising and lowering the drill string near the bottom of the hole "sweeps" loose material and cuttings from the bottom of the hole and pushes this material up the return flow path defined by a collection passage in the center of the bit, the collection tube in the pneumatic hammer, and the return flow path defined within the center tube of the stem rod 14 and the reverse circulation drill string. The drill string is typically rotated during a sweeping operation to keep the threaded joints along the drill string tight. After the bottom of the hole has been "swept," the drill string is raised to bring the shoulder 36 of the packer adaptor into contact with the bottom of the packer 18 to deactivate the packer 18 as described above. With the deactivated packer resting on top of the packer adaptor, the drill string and BHA 10 are lowered to the bottom of the bore 12 and the drill string is raised again to re-activate the packer 18 in a location just above the pneumatic hammer 16 and packer adaptor 34. A new section of drill rod is then connected to the drill string and the hammer 16 and bit 24 are again operated to deepen the bore 12, and the cycle is repeated as the bore is drilled.

According to this embodiment of the disclosed system and method of pneumatic drilling, the bottom of the bore 12 is temporarily flooded by the column of fluid held back by the packer 18 when the packer 18 is deactivated for repositioning. The deactivated packer 18 still fits relatively close to the inside surface of the bore 12 and acts as a flow-limiting orifice, but more fluid will enter the lower clearance region than during the drilling phase. Since the return flow path at the center of the bit 24, hammer 16, stem rod 14 and drill string is in communication with atmosphere at the surface (low pressure), high pressure fluid in the lower clearance region 30 surrounding the drill string and bit 24 will flow into the return flow path and would fill the return path inside the drill string if given enough time. It is desirable to avoid prolonged deactivation of the packer 18, but even if fluid substantially fills the bottom of the bore 12, upon re-activation of the packer 18, the pressure of the fluid head above the packer 18 is removed and only the fluid remaining beneath the packer 18 and in the return flow path need be removed. In some instances the fluid remaining beneath the packer and that in the return flow path can be evacuated with air pressure circulation. Since the volume in the return flow path (inner tube of the stem rod 14 and drill string) is less than in the clearance region, circulating air pressure through the hammer 16 and bit 24 will aerate this fluid allowing it to be flushed out via the return flow path at the center of the drill string. Once the greater portion of this fluid is evacuated, hammer drilling can re-commence. In very deep applications there could be too much fluid left in the inner tube of the RC drill string to be able to evacuate it, or the time required to aerate it would be onerous. The simplest means to overcome this would be to provide a valve near the bottom of the BHA that shuts off the return path through the inner tube (the supply air path through the outer annulus of the dual walled drill pipe is closed off by the hammer's check valve). One way to limit filling of the return flow path is to limit the amount of time the packer is deactivated. According to an alternative embodiment of the disclosed system and method, a collection tube blocking valve ("collection tube blocker") is provided to block the return flow path while the packer 18 is deactivated for repositioning.

Figure 12:
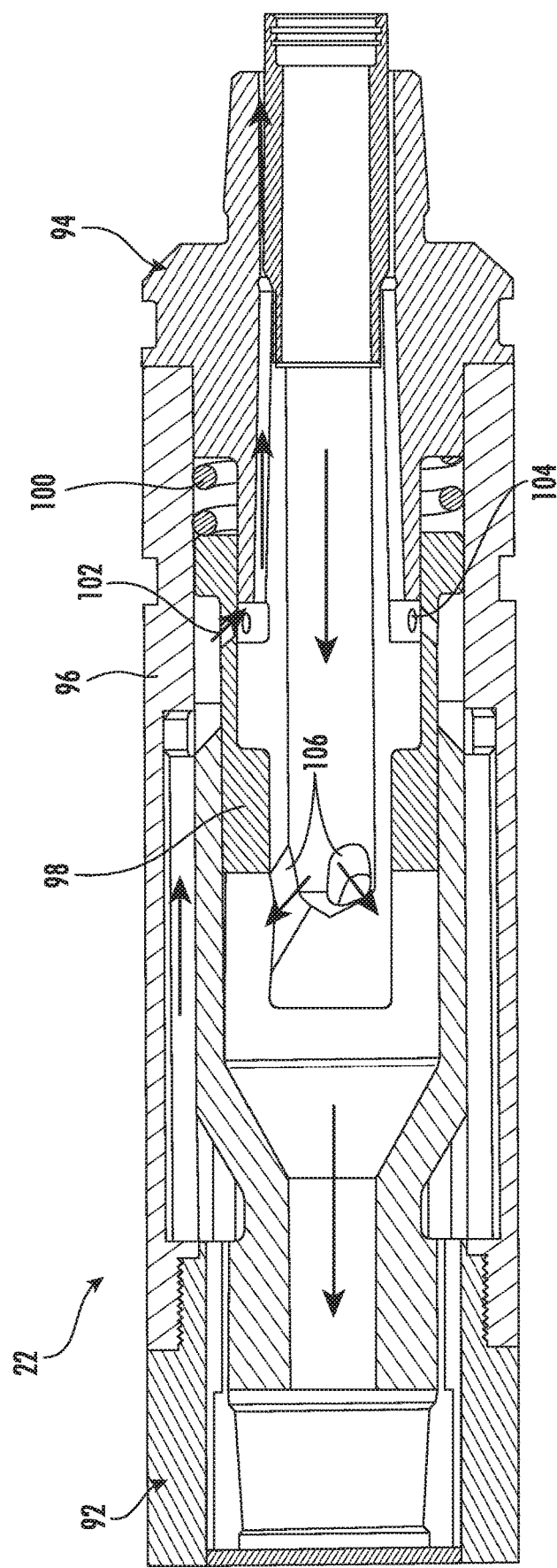
FIG. 12 is a sectional view through an exhaust path blocking valve, showing the valve in an open position according to aspects of the disclosure.
Figure 13:
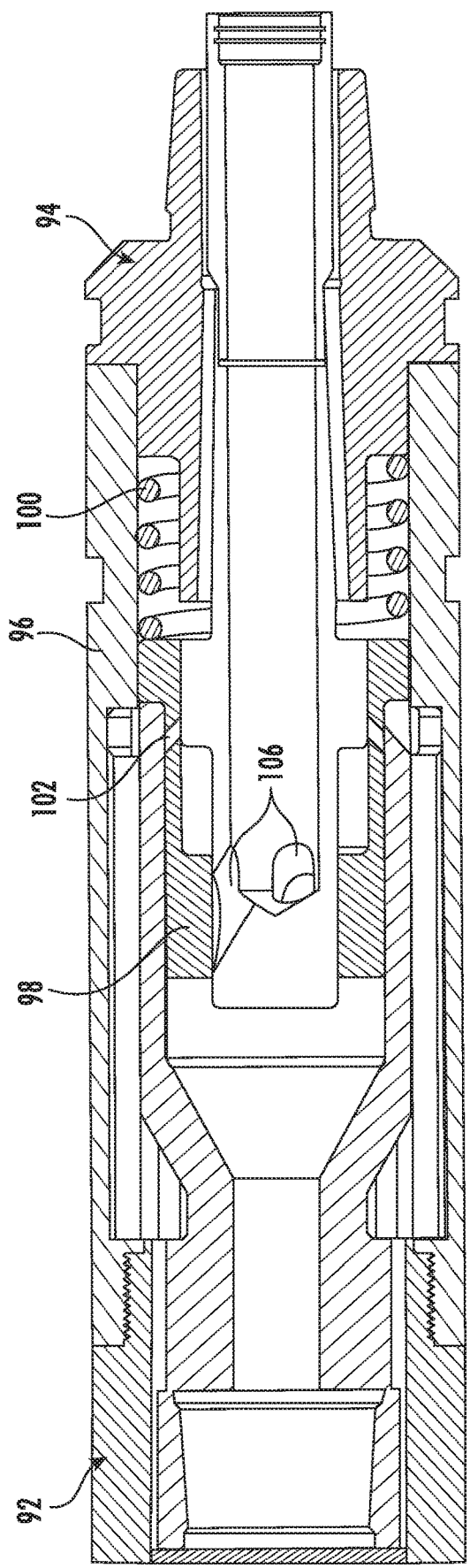
FIG. 13 is a sectional view through the exhaust path blocking valve of FIG. 12, showing the valve in a closed position according to aspects of the disclosure.

FIG. 2 illustrates an alternative BHA 20, which includes a collection tube blocker 22 according to aspects of the disclosure. The collection tube blocker 22 can be installed between the hammer 16 and the packer adaptor 34. According to aspects of the disclosure, a collection tube blocker 22 may be installed at other locations in the drill string, for example above the stem rod 14. It is also possible to use two or more collection tube blockers 22 in the drill string to provide redundancy. Further, a collection tube blocker 22 may be used in drilling operations that do not employ the disclosed deep hole BHA 10 with a packer 18 slideable on the stem rod 14. The packer adaptor 34 can be integrated into the collection tube blocker 22, and these components are not limited to being separate parts as disclosed. FIGS. 12 and 13 are sectional views of one embodiment of a pneumatically actuated collection tube blocker 22 according to aspects of the disclosure. Other means for actuating a collection tube blocker may be employed, for example a wire line, battery pack, hydraulic actuation, or mechanical forces generated by raising, lowering and/or rotating the drill string.

According to the disclosure, the collection tube blocker 22 of FIGS. 12 and 13 is held in an open position when high pressure air is being delivered through the air delivery annulus and closes when high pressure air is turned off. As shown in FIGS. 12 and 13, the collection tube blocker 22 includes an air intake 92 at the upper end, a valve base 94 at the lower end, and a cylindrical valve case 96 threaded to both the air intake 92 and valve base 94. Within the valve case 96, a valve member 98 is biased by a valve spring 100 toward a closed position as shown in FIG. 13. High pressure air fills a region above the valve member 98 and moves the valve member 98 against the bias of the valve spring 100 to the open position shown in FIG. 12. In the open position, high pressure air flows through openings 102 in the valve member 98, which are aligned with openings 104 in the valve base 94, allowing high pressure air to flow to the hammer 16 and bit 24 during drilling. In the open position, the valve member 98 uncovers a plurality of openings 106 communicating between the return flow path of the hammer and bit and a return flow path extending upward through the top of the collection tube blocker 22, packer adaptor 34, stem rod 14, and drill string. During drilling, exhaust and cuttings from the RC hammer and bit flow in the direction of the broad arrows in FIG. 12, upward through the center of the collection tube blocker 22, through the openings 106 and into the return flow path of the drill string.

As discussed above, when the stem rod 14 has advanced far enough that the top end of the stem rod 14 is near the packer 18, drilling must be stopped to permit addition of a new section of drill pipe. In a system incorporating a collection tube blocker 22, it may be advantageous to raise the BHA 20 from the bottom of the hole, placing the bit in a "blow" position and sweep the hole to clear cuttings and material from the bottom of the hole before shutting off the high pressure air. Clearing cuttings from the collection tube blocker 22 may prevent clogging of the return flow path when the collection tube blocker 22 is closed and then re-opened. In the disclosed collection tube blocker 22 when the high pressure air is turned off, the valve member 98 is closed by the valve spring 100, closing both the air supply and return flow path to prevent entry of high pressure fluid when the packer 18 is deactivated. A collection tube blocker 22 may alternatively be configured to close only the return flow path, and is not limited to a configuration that closes both the return flow path and air supply.

With drilling stopped and high pressure air turned off, the disclosed collection tube blocker 22 is closed, as shown in FIG. 13. With the collection tube blocker 22 closed, the drill string is raised to deactivate the packer 18 and the BHA 20 is again lowered to the bottom of the bore 12, where the drill string is again raised to activate the packer 18 in a location just above the BHA 20. According to aspects of the disclosure, the packer 18 is deactivated, re-positioned and re-activated near the bottom of the bore 12 before adding a new section of drill pipe to the top of the drill string. With the collection tube blocker 22 closed, high pressure fluid from the upper clearance region 32 surrounding the drill string is prevented from flowing into the return flow path inside the stem rod 14 and drill string. A new section of drill pipe is added, high pressure air is turned on, the collection tube blocker 22 returns to the open position and drilling continues until the top of the stem rod 14 is near the activated packer 18, when the steps of: raising the drill string to put the bit into "blow," sweeping the bottom of the bore to clear cuttings from the collection tube blocker 22, turning off high pressure air to close the collection tube blocker 22, deactivating the packer 18, lowering the BHA 20 to the bottom of the bore 12, reactivating the packer 18, adding a new section of drill pipe, turning on high pressure air to open the collection tube blocker 22 and re-starting drilling are repeated.

The disclosed system and method allow pneumatic hammer drilling at great depths without the consideration of back hole pressures. The hammer exhaust will only be impeded by the pressure loss in the drill pipe, which can be controlled and compensated for. Friction losses in adequately sized pipe should be in the vicinity of, for example 200-300 psi (rather than 10,000 psi) and thus could be adequately compensated for using standard boosters. Air requirements for drilling at great depths can be significantly reduced in both volume and pressure by employing a packer 18 slideable on the stem rod 14 according to aspects of the disclosure.

The back hole pressure encountered at the hole bottom is created by the drilling mud and encountered fluids such as water filling the annulus surrounding the drill string. Using a nominal figure of 0.44 psi/foot of fluid, the back hole pressure at the bottom of a fluid filled 20,000 foot deep hole is approximately 8800 psi. When the packer is activated and sealed in the bore 12 and against the stem rod 14, the weight of the fluid and thus the greatest portion of the back hole pressure is held back. In the drilling condition with the packer 18 activated, the hammer supply air exhausts out the bit face and flushes up via the inner tube of the bit 24, hammer 16, stem rod 14 and drill string. As long as the packer 18 is expanded and sealed, exhaust air will clear the annulus below the packer 18 (the lower clearance region 30) and flush up the drill pipe to the surface, inhibited only by the back pressure induced by friction in the drill pipe (pressure loss in pipe). The back pressure in the bit region remains low even if there is some bypass of fluid at the packer 18, either at the bore wall interface or the packer/ stem rod seal interface, since a small quantity hydraulic fluid escaping into an air pocket would not significantly increase the pocket pressure.

In one implementation of the method, the BHA 10, 20 is inserted into a starter hole that was previously drilled to a depth of at least 1000 meters, i.e., the top of the stem rod is connected to a string of drill rods extending for at least 1000 meters. The BHA 10, 20 can include means for limiting the sliding of the stem rod 14 relative to the packer 18, to be within the length of the stem rod. While the disclosed packer 18 slideable on a stem rod 14 has been disclosed as having particular advantages at great depths, the disclosed systems and methods can be used in drilling operations at any depth.

Figure 14:
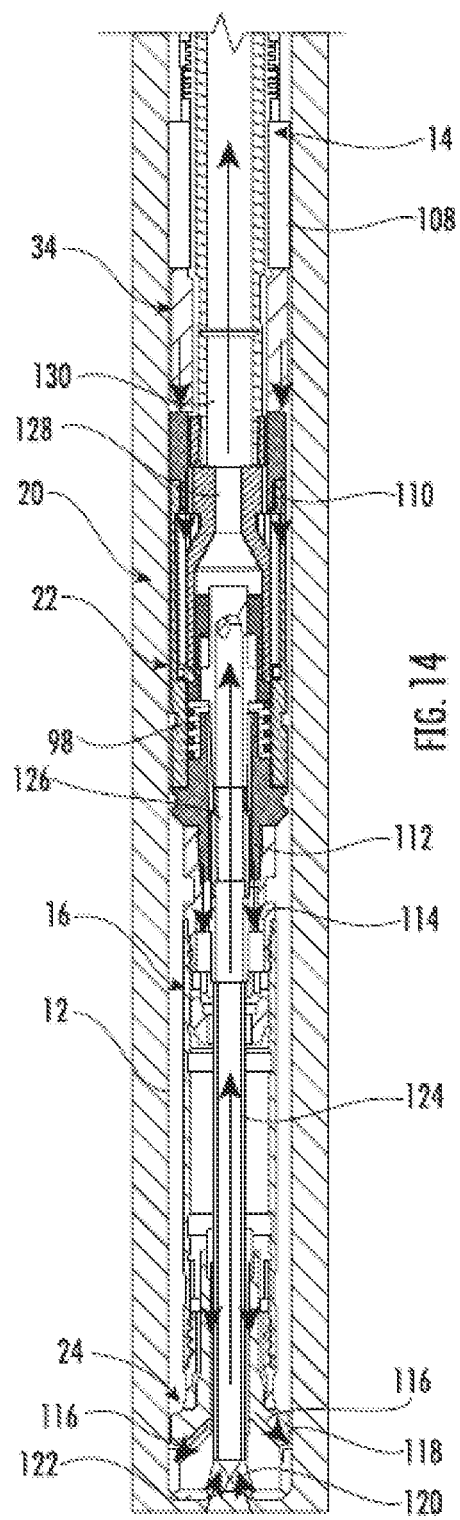
FIG. 14 is a sectional view through a reverse circulation pneumatic hammer in conjunction with the exhaust path blocking valve of FIGS. 12 and 13 in a ground bore according to aspects of the disclosure.

FIG. 14 is a sectional view of part of a BHA 20 employing a collection tube blocker 22 at the bottom of a bore 12. FIG. 14 shows a bit 24, a pneumatic hammer 16, collection tube blocker 22, packer adaptor 34 and stem rod 14 and flow paths for compressed air and exhaust when the BHA 20 is operating to deepen the bore 12. Air is delivered through an air delivery annulus 108 defined by the drill string (not illustrated, but well-known) that extends through the packer adaptor 34. Air enters the collection tube blocker 22 through an air inlet 110, moves the valve member 98 to the open position, which connects the air inlet 110 to the air outlet 112 of the collection tube blocker 22. Air enters the pneumatic hammer 16 at an air intake 114, where during drilling the air provides energy to the reciprocating mechanism of the hammer 14. Exhaust from the pneumatic hammer 16 is released into the bore 12 through exhaust passages 116 open to the side surface 118 of the bit 24. After release into the bore 12, the exhaust picks up cuttings from the bottom of the bore and reverses direction, entering a collection passage 120 open at the bottom face 122 of the bit 24. Exhaust and material from the bottom of the bore then enter the collection tube 124 at the center of the pneumatic hammer 16. The collection tube blocker 22 includes an inlet passage 126 in communication with the collection tube 124 and an outlet passage 128 in communication with a return flow path 130 extending through the packer adaptor 34, the stem rod 14 and the drill string. In an open position, the collection tube blocker valve member 98 allows communication between the inlet passage 126 and outlet passage 128, and in a closed position, the valve member 98 blocks communication between the inlet passage 126 and the outlet passage 128. In the illustrated embodiment of a collection tube blocker 22, the valve member 98 in a closed position also blocks air flow between the air inlet 110 and the air outlet 112 of the collection tube blocker 22. Alternative embodiments of a collection tube blocker 22 may be configured to block only the return flow path 130.

What is claimed:

1. A bottom assembly for drilling a deep bore from the surface into an earth formation with a pneumatic percussion hammer that advances a drill string including a plurality of connected reverse circulation drill rods, said bottom assembly comprising:
    a percussion bit;
    a reverse circulation pneumatic hammer operatively connected to the bit;
    a reverse circulation stem rod having axially opposed top and bottom, and a radially outer surface, with the bottom rigidly connected to the pneumatic hammer;
    a packer surrounding the stem rod, with a packer inner surface confronting the outer surface of the stem rod in an axially slideable relationship relative to a longitudinal axis of the stem rod, and a packer outer surface radially spaced from the packer inner surface, said packer outer surface including at least one component which in a deactivated condition of the packer projects a first radial distance from the outer surface of said stem rod and in an activated condition of the packer projects a second radial distance from the outside surface of the stem rod, said second radial distance being greater than said first radial distance,
    an activation mechanism arranged to activate said packer by applying force to said at least one component to cause said component to move from said first radial distance to said second radial distance, said activation mechanism being fixable in a first position where said force is applied until said packer is deactivated by moving said activation mechanism to a second position where said force is removed and said at least one component returns to said first radial distance,
    wherein said axially sliding relationship between the inner surface and the stem rod outer surface is present when the packer is activated and deactivated.

2. The bottom assembly of claim 1, wherein said packer is activated using one of the group consisting of a wire line, battery pack, hydraulic actuation, or mechanical forces generated by raising, lowering and/or rotating the drill string.

3. The bottom assembly of claim 1, wherein said at least one component includes an annular, flexible seal distorted by application of said force to bulge radially outwardly.

4. The bottom assembly of claim 1, wherein said at least one component includes a plurality of rigid grips, said grips having a deactivated position at said first radial distance and an activated position at said second radial distance, said second radial distance being greater than said first radial distance.

5. The bottom assembly of claim 1, wherein the bit has an effective outer diameter and said first radial distance corresponds to a deactivated packer diameter smaller than the bit effective diameter and said second radial distance corresponds to an activated packer diameter at least equal to the bit effective diameter.

6. The bottom assembly of claim 1, wherein the drill string is in a bore having an inside surface, said packer in an activated condition is fixed against the inside surface of said bore to resist axial and rotational movement relative to the inside surface of said bore while maintaining said axially sliding relationship relative to the stem rod.

7. The bottom assembly of claim 1, wherein said at least one component includes an annular, flexible seal distorted by application of said force to bulge radially outwardly and a plurality of rigid grips, said grips having a deactivated position at said first radial distance and an activated position at said second radial distance.

8. The bottom assembly of claim 1, wherein said percussion bit has a bottom face and a side surface and includes at least one exhaust passage open at said side surface and at least one collection passage open at said bottom face, said pneumatic hammer including a collection tube connected to said at least one collection passage, said stem rod including an inner tube defining a return flow path, said pneumatic hammer releasing exhaust during operation, exhaust from said pneumatic hammer released through said at least one exhaust passage and flowing through said at least one collection passage, said collection tube and into said return flow path.

9. The bottom assembly of claim 8, comprising a collection tube blocker connected between said pneumatic hammer and said stem rod, said collection tube blocker comprising:

a base defining an inlet passage in communication with said collection tube, a top defining a outlet passage in communication with the return flow path in said stem rod; and a valve member moveable between an open position allowing communication between the inlet passage and outlet passage and a closed position blocking communication between said inlet passage and said outlet passage.

10. The bottom assembly of claim 9, wherein said stem rod includes an outer tube and defines an air delivery annulus between said inner tube and said outer tube, said pneumatic hammer includes an air intake passage, and said collection tube blocker defines an air inlet connected to the air delivery annulus and an air outlet in communication with said air intake passage, said valve member open position allowing air flow between said air inlet and said air outlet and said valve member closed position preventing air flow between said air inlet and said air outlet.

11. The bottom assembly of claim 10, wherein said valve member is moved from the open position to the closed position by air pressure at said air intake.

12. A method for drilling a deep bore from the surface of an earth formation with a pneumatic percussion hammer that advances a drill string including a plurality of connected reverse circulation drill rods, comprising the steps of:
   a. drilling a starter bore from the surface, thereby defining a bore in the earth formation with an inside surface and a bottom;
   b. inserting a bottom assembly into the bore, including a percussion bit at the bottom of the hole, a reverse circulation pneumatic hammer operatively connected to the bit, a reverse circulation stem rod connected at a bottom end to the pneumatic hammer and extending with annular clearance between an outside surface of the drill rod and the inside surface of the bore to a top end, and a packer surrounding the stem rod and positioned at the bottom of the stem rod adjacently above the hammer, in the annular clearance;
   c. expanding the packer radially outward against the inside surface of the bore, thereby forming an annular seal between the stem rod and the inside surface of the bore to separate an upper annular clearance above the expanded packer from a lower annular clearance between the packer and the bottom of the bore;
   d. maintaining a column of drilling fluids or encountered liquids above the packer in the upper annular clearance, thereby separating the lower annular clearance from hydraulic pressure generated by the column of drilling liquids or encountered fluids in the upper annular clearance;
   e. operating the pneumatic hammer and bit while advancing the bit, hammer, and stem rod together through the bottom of the hole, while (i) the stem rod advances with a sliding seal against an inside surface of the expanded packer, wherein the sliding seal comprises an axially slideable relationship relative to a longitudinal axis of the stem rod; (ii) pneumatic pressurization and exhaust for the hammer are guided within the stem rod; and (iii) the exhaust from the hammer is discharged into the lower clearance region;
   f. stopping operation of the pneumatic hammer and bit when the top of the stem rod has advanced to a position adjacent the expanded packer;
   g. retracting the packer to break the annular seal between the stem rod and the inside surface of the bore; and
   h. re-positioning the packer on the stem rod, adjacently above the hammer;
   i. expanding the packer radially outward against the inside surface of the bore,
   j. connecting another drill rod at the top of the drill string; and
   k. repeating the steps c-i of expanding, maintaining, operating, stopping, retracting, repositioning, expanding and connecting as the hole is drilled deeper into the formation.

13. The method of claim 12, wherein said packer is expanded using one of the group consisting of a wire line, battery pack, hydraulic actuation, or mechanical forces generated by raising, lowering and/or rotating the drill string.

14. The method of claim 12, wherein the step of expanding the packer radially outward comprises:
   applying a force to move at least one component of the packer from a retracted position a first radial distance from an outside surface of the stem rod to an expanded position a second radial distance from the outside surface of the stem rod, said second distance being greater than said first distance.

15. The method of claim 14, wherein said at least one component includes an annular, flexible seal and application of said force causes the seal to bulge radially outwardly.

16. The method of claim 14, wherein said at least one component includes a plurality of rigid grips, said grips having a retracted position at a first radial distance from an outside surface of the stem rod and an expanded position at a second radial distance from the outside surface of the stem rod, said second radial distance being greater than said first radial distance, and application of said force moves said grips from said retracted position to said expanded position.

17. The method of claim 12, wherein said percussion bit has a bottom face and a side surface includes at least one exhaust passage open at said side surface and at least one collection passage open at said bottom face, said pneumatic hammer includes a collection tube connected to said at least one collection passage, said stem rod including an inner tube defining a return flow path connected to said collection tube, said pneumatic hammer releasing exhaust through said at least one exhaust passage during said step of operation, exhaust from said pneumatic hammer released through said at least one exhaust passage and flowing through said at least one collection passage, said collection tube and into said return flow path, said method comprising:
   closing the connection between said collection tube and said return flow path before said step of retracting said packer; and
   opening the connection between said collection tube and said return flow path after said steps of re-positioning the packer on the stem rod and expanding the packer.

18. The method of claim 17, wherein said stem rod includes an outer tube and defines an air delivery annulus between said inner tube and said outer tube, said pneumatic hammer includes an air intake passage in communication with said air delivery annulus, said method comprising:
   closing communication between said air delivery annulus and said air intake passage before said step of retracting said packer; and
   opening communication between said air delivery annulus and said air intake passage after said steps of re-positioning the packer on the stem rod and expanding the packer.

19. The method of claim 17, wherein said drill string or said bottom assembly includes a valve arranged to close the connection between the collection tube and the return flow path and said steps of closing and opening the connection between the collection tube and the return flow path comprises actuating said valve using air pressure, a wire line, battery pack, hydraulic actuation, or mechanical forces generated by raising, lowering and/or rotating the drill string.

20. The method of claim 19, wherein more than one valve for closing the connection between the collection tube and the return flow path are arranged in said drill string or said bottom assembly, and the step of closing the connection between the collection tube and the return flow path comprises actuating one or more of said valves.

\* \* \* \* \*